UNITED STATES PATENT OFFICE.

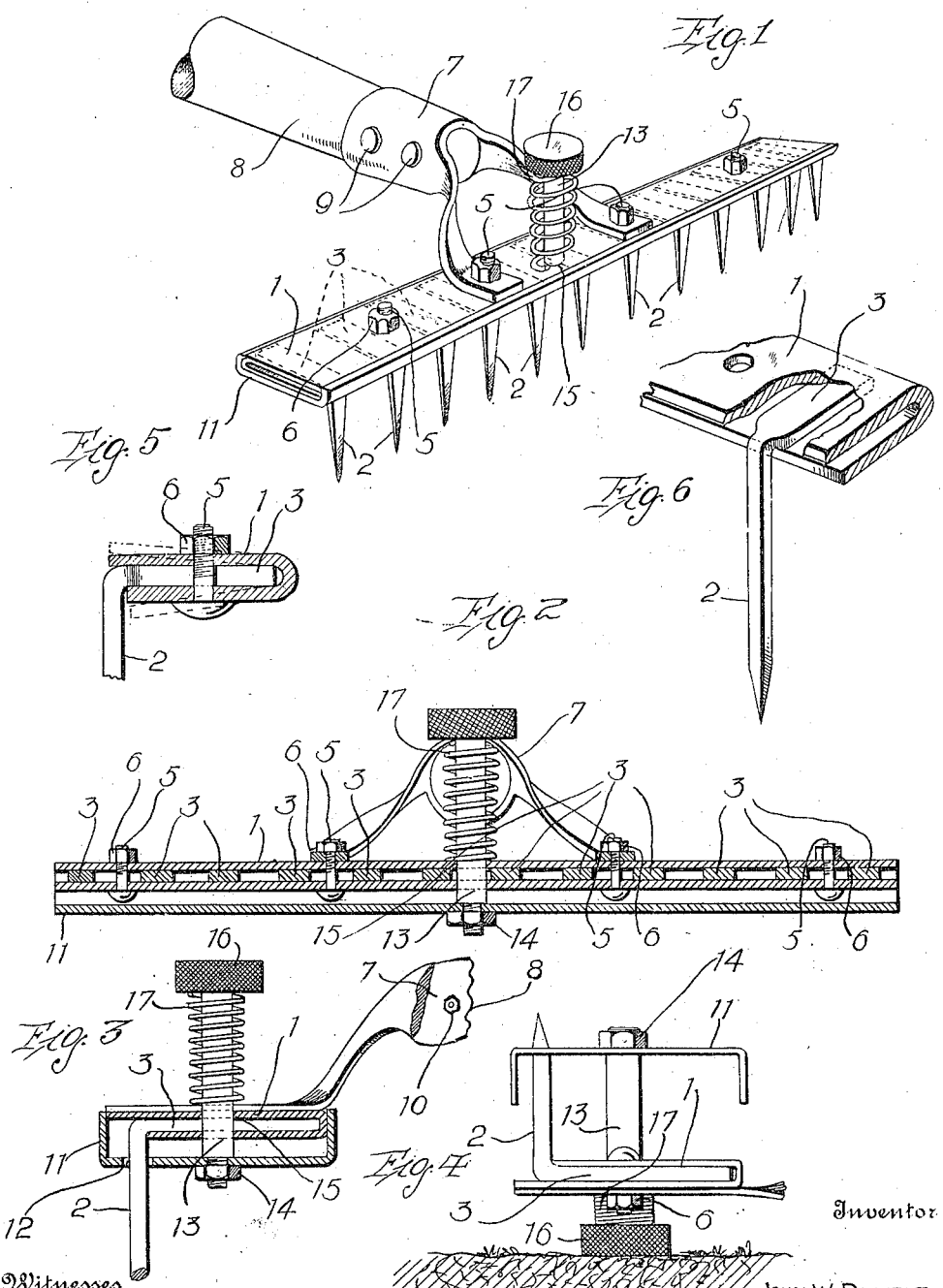

JOHN W. DOWDLE, OF MINERAL SPRINGS, ARKANSAS.

SELF-CLEANING RAKE.

1,092,522.  Specification of Letters Patent.  Patented Apr. 7, 1914.

Application filed April 26, 1913. Serial No. 763,923.

*To all whom it may concern:*

Be it known that I, JOHN W. DOWDLE, a citizen of the United States, residing at Mineral Springs, in the county of Howard and State of Arkansas, have invented certain new and useful Improvements in Self-Cleaning Rakes, of which the following is a specification, reference being had to the accompanying drawings.

This invention relates to new and useful improvements in rakes and more particularly to a self-cleaning rake and my object is to provide a device of this character which will enable the trash and the like to be removed from the prongs or teeth of the rake by other than the hand of the operator.

A further object of the invention resides in providing a trash cleaning member on the head of the rake which is normally held in raised and inoperative position and which may be readily disposed to its effective and operative position, when desired.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claim.

In the accompanying drawing forming a part of this application, Figure 1 is a perspective view of the device. Fig. 2 is a vertical longitudinal section therethrough. Fig. 3 is a vertical transverse section through the same. Fig. 4 is a side elevation of the device showing the trash removing member in its effective and operative position. Fig. 5 is a vertical section through a portion of the rake head showing in dotted lines the position of the sections of the rake head when the same are not clamped to the teeth: and Fig. 6 is a perspective view with parts broken away and showing the position of the teeth within the rake head.

In describing my invention, I shall refer to the drawing in which similar reference characters designate corresponding parts throughout the several views and in which—

1 indicates a rake head consisting of a metallic bar doubled upon itself its full length to provide a substantial channel-shaped member, the sections of which are slightly spaced from one another to form spring sections. A plurality of teeth 2 having angular extensions 3 thereon, are provided, said angular extensions being disposed between the sections of the channel-shaped bar or rake head and said teeth are secured in position by a plurality of bolts 5 which extend through the sections of said bar and nuts 6 engaged with said bolts. These nuts and bolts obviously afford a means whereby the spring sections of said bar or head may be clamped together and secure the teeth in rigid position therein, but this securing means also affords a ready removal of the teeth therefrom in case of damage thereto, whereby new teeth may be readily substituted therefor. In Fig 5, I have shown in full lines a view wherein the sections of the head are clamped tightly against the angular ends of the teeth, securing the latter therebetween and in dotted lines, I have shown the position of the sections of the head when the clamping means is released.

Secured to the upper face of the bar which forms the head 1, by means of certain of the aforesaid bolts and nuts 5 and 6 respectively, are the ends of a pair of divergent arms which are formed on and extend from a ferrule or the like 7. This ferrule is secured to the lower end of a handle member 8, by means of the bolts 9 and nuts 10.

My invention primarily contemplates the provision of a means for readily removing the trash from the teeth of the rake as the latter is being used and, to this end, I provide a trash removing bar or plate 11 which is channel-shaped in cross section and adapted to be applied to the under face of the bar or head 1 to substantially inclose the latter therein. This channel-shaped bar or plate 11 is provided throughout its length with openings 12, to receive the rake teeth therethrough and a bolt or the like 13 which has the lower end thereof reduced and disposed through an opening in said plate is secured to the latter by means of a nut 14 engaged with the extreme free end of said bolt. This bolt projects through a central opening 15 in the plate or bar forming the head of the rake and encircling said bolt between the head 16 thereof and the top face of said rake head, is a coil spring 17, the tendency of which is to force said head upwardly to correspondingly dispose the trash plate 11 to its raised position in engagement with the under face of said rake head. In order to lower the trash removing plate or bar 11, so as to remove the trash engaged with the teeth of the rake, pressure must be placed on the head of the bolt to overcome the tension of the spring encircling the latter.

In practice, the rake is used in the ordinary manner and when trash adheres to the teeth thereof, and it is desired to remove the same, said rake is turned so that the bolt is disposed downwardly. The head of said bolt is then engaged with the ground and pressure placed thereon which will, obviously, force the trash removing member away from the rake head across the length of the teeth, thereby removing the trash therefrom. When pressure is released, the trash removing member will be returned to its initial position, under tension of the spring 17. It will be seen also, that in its normal and initial position, said trash removing member 11 will afford a strengthening means for the teeth of the rake.

From the foregoing description of the construction of my improved device, the operation thereof will be readily understood and it will be seen that I have provided a device which is simple and durable in construction, inexpensive to manufacture and one which will be very efficient and useful in operation.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what is claimed is:—

In a device of the class described, a rake head consisting of a plate doubled upon itself to form a pair of spring spaced sections, the upper section thereof projecting slightly beyond the lower section, a plurality of teeth having angular upper portions formed thereon for reception between the sections of said rake head, means to clamp the spring spaced sections of said rake head together and simultaneously secure said teeth therein, a channel-shaped plate adapted to be applied to the under face of said rake head to entirely inclose the front and rear edges of the latter, the bottom of said channel-shaped plate being provided with openings adjacent its forward edge, loosely receiving said teeth therethrough, and means for yieldingly retaining said plate in position against the under face of the rake head, said plate also forming a bracing means for the teeth and the head.

In testimony whereof I hereunto affix my signature in the presence of two witnesses.

JOHN W. DOWDLE.

Witnesses:
H. R. BELL,
H. L. CROFTON.